Dec. 26, 1922.
E. F. HAPPENSACK.
BOX AND COUPLING FOR CHAIN PUMPS.
FILED NOV. 25, 1921.
1,439,814.
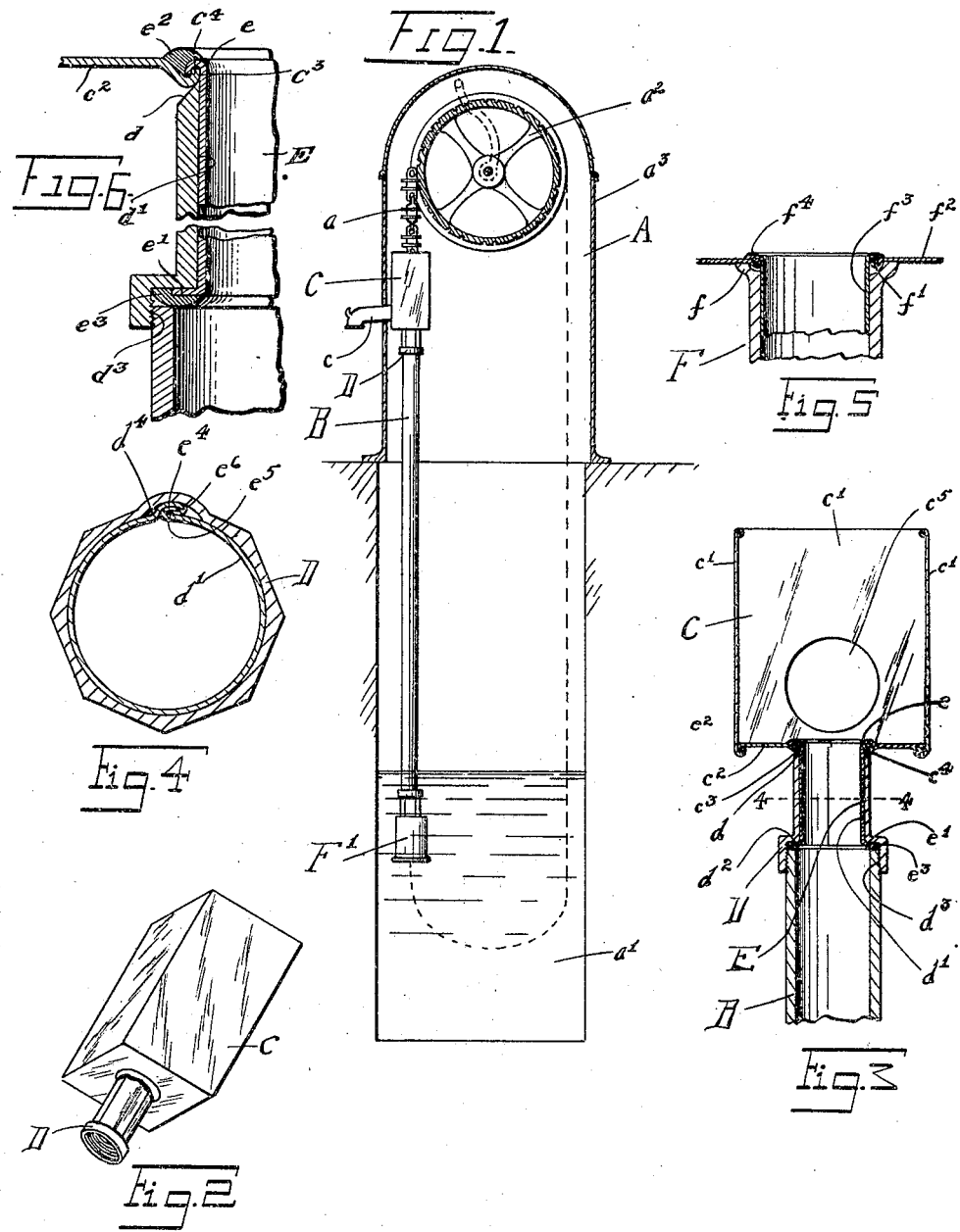
Inventor
Edward F. Happensack
By Walter F. Murray
Attorney Patented Dec. 26, 1922.

1,439,814

UNITED STATES PATENT OFFICE.

EDWARD F. HAPPENSACK, OF CINCINNATI, OHIO, ASSIGNOR TO THE O. P. SCHRIVER COMPANY, OF CINCINNATI, OHIO, A CORPORATION OF OHIO.

BOX AND COUPLING FOR CHAIN PUMPS.

Application filed November 25, 1921. Serial No. 517,513.

*To all whom it may concern:*

Be it known that I, EDWARD F. HAPPENSACK, citizen of the United States of America, and resident of Cincinnati, in the county of Hamilton and State of Ohio, have invented a new and useful Improvement in a Box and Coupling for Chain Pumps, of which the following is a specification.

It has been customary in chain pumps of the type disclosed in the accompanying drawing, to have a section of tubing whose upper edge was rolled into a bead which engaged and generally was soldered upon the bottom of the reservoir or receptacle, of such chain pumps, and to have at the lower end of the short tubing E, a threaded cast coupling into which the upper end of the upper section of pipe B extending downwardly into the water supply, was screw-threaded. An objection to this construction is that there is considerable play and sway in the tube, due to the movement of the pipe and joint, and this would occasion the tubing becoming loose in the joint at the bottom of the reservoir.

Another objection to this was that it required the use of additional short sections of tubing.

An object of my invention is to provide a rigid connection between the receptacle, the tubing, the coupling and the pipe.

Another object is to provide a coupling joint between the elements referred to, which joint will brace the tubing against the play and sway of the pipe.

These and other objects are obtained by means described herein and disclosed in the accompanying drawing in which:

Fig. 1 is a sectional view of a chain pump having mounted on it a box and coupling embodying my invention.

Fig. 2 is a perspective view of a box and coupling embodying my invention.

Fig. 3 is a flange section view of a box and coupling.

Fig. 4 is an enlarged sectional view of line 4—4 of Fig. 3.

Fig. 5 is a detail view of a modified form of coupling.

Fig. 6 is a fragmental sectional view on an enlarged scale, showing in detail, parts of the device embodying my invention.

My invention lies in using a section of tubing E which is less than the length of the coupling D, rolling the upper end of the tubing into the bead $e$ at the bottom of the reservoir or box C, surrounding this tubing with the coupling having its upper end beveled and which upper end contracts with the plate $C^2$, whereby the beading and the coupling are clamped upon the plate, thereby securing a compact joint and bracing the same against the play and sway of the pipe.

The chain pump A, has a customary link chain $a$, extending from the water supply $a^1$ to and about wheel $a^2$ disposed in the pump box $a^3$. As the chain $a$ moves upwardly from the water supply, it passes through the pipe B having disposed at its upper end a receptacle C from which a spout $c$ extends through the pump box $a^3$. The receptacle C comprises sides or walls $c^1$ the lower edges of which have mounted upon them a bottom or plate $c^2$ having a slot or perforation $c^3$ therein. A flange $c^4$ is formed on the plate and defines the slot $c^3$. A coupling D having a tapered upper end $d$, engages the external side of the flange $c^4$. The bore $d'$ of the coupling is of substantially the same size and shape as the slot $c^3$. The coupling has a shoulder $d^2$ formed intermediate its ends. The lower end of the coupling has internal screw threads $d^3$ adapted to engage the threaded upper end of the pipe B. A tubing section E is disposed within the coupling, and has its upper end rounded or turned upon itself to form a bead $e$ adapted to lie upon the interior surface of the flange. The lower end of the tubing is flared or turned upon itself so as to form a ring $e'$ which engages the shoulder on the coupling. A ring of solder $e^2$ surrounds the bead $e$ and engages the plate $c^2$. A similar ring of solder $e^3$ engages the ring $e'$ and the coupling. A rib $e^4$ is formed by overlapping the longitudinal ends $e^5$ and $e^6$ of the tubing, and said rib extends longitudinally of the tubing. The coupling has a longitudinal groove or pocket $d^4$ adapted to accommodate the rib $e^4$. The receptacle C has a suitable opening $c^5$ in one of its walls $c'$, whereby the spout $c$ may communicate with the interior of the reservoir or receptacle. Similar coupling means may be employed upon the lower end of the pipe B whereby the guiding member $F^1$ is secured to said pipe.

The tubing section E serves to rigidly secure the coupling in position such that the tapering upper end of the coupling firmly engages the flange on the plate. From this it is apparent that there will be practically no relative movement between the receptacle, the tubing, and the coupling. It is also apparent that should the tubing extend thru the perforation $c^3$ somewhat loosely, the tapered end $d$ of the coupling will extend into said perforation, possible to the extent of engaging the bead on the tubing, thereby clamping the bead on the tapered end of the coupling, and the tapered face on the coupling binding upon the wall of the slot $c^3$.

In the modification shown in Fig. 5, the coupling F is provided at its upper end with a cup like flange $f$, adapted to accommodate the flange $f'$ formed on the plate $f^2$, and into which flange $f'$ the upper end of the tubing $f^3$ is locked as shown. A suitable ring of solder $f^4$ surrounds the joint between the plate and the tubing.

I claim:

1. In a coupling device of the class described the combination of a slotted plate, tubing extending through the slot in the plate, a bead formed on the tube adapted to engage one side of the plate, and a coupling mounted on the tubing engaging the other side of the plate.

2. In a coupling device of the class described the combination of a slotted plate, tubing extending through the slot in the plate, a bead formed on the tubing engaging one side of the plate, a coupling mounted on the tubing and engaging the opposite side of the plate, and a shoulder on the coupling over which the one end of the tubing is turned.

3. In a coupling device of the class described the combination of a slotted plate, a coupling adapted to engage one side of the plate adjacent to and substantially concentric with the slot in the plate, and tubing extending through the slot in the plate and having one end thereof in engagement upon the plate and having its other end in engagement upon the interior of the coupling, the tubing serving to rigidly connect the plate and the coupling.

4. In a coupling device of the class described the combination of a slotted plate, a flange surrounding the slot in the plate, a tube extending thru the slot, a bead on the tube engaging the flange, and a coupling extending over the tubing and secured thereto, the coupling and bead rigidly securing the flange between one another.

In testimony whereof, I have hereunto subscribed my name this 18th day of November, 1921.

EDWARD F. HAPPENSACK.